United States Patent
Sasajima et al.

[11] Patent Number: 5,892,340
[45] Date of Patent: Apr. 6, 1999

[54] VEHICLE SLIDING DOOR OPENING/CLOSING CONTROL DEVICE

[75] Inventors: Kouji Sasajima; Kiyohide Nagase, both of Wako, Japan

[73] Assignee: Honda Giken Kogyo Kabushiki Kaisha, Tokyo, Japan

[21] Appl. No.: 856,547

[22] Filed: May 15, 1997

[30] Foreign Application Priority Data

Jun. 7, 1996 [JP] Japan ................................ 8-146308

[51] Int. Cl.$^6$ ........................................ B60J 5/06
[52] U.S. Cl. .................... 318/293; 318/286; 318/380; 318/648; 49/31
[58] Field of Search ................................ 318/264, 265, 318/266, 280, 286, 287, 291, 293, 375, 379, 380, 466, 467, 468, 489, 501, 514, 648; 388/809, 811, 816, 819; 49/13, 31, 35

[56] References Cited

U.S. PATENT DOCUMENTS 5,241,680 8/1993 Cole et al. .
5,767,588 6/1998 Nakaya et al. .......................... 307/10.2

FOREIGN PATENT DOCUMENTS 61-191781 8/1986 Japan .
4-62883 5/1992 Japan .
4-285282 10/1992 Japan .
6-13915 2/1994 Japan .
6-13357 4/1994 Japan .
6-144000 5/1994 Japan .

*Primary Examiner*—Bentsu Ro
*Attorney, Agent, or Firm*—Merchant, Gould, Smith, Edell, Welter & Schmidt, P.A.

[57] ABSTRACT

A vehicle sliding door opening/closing control device comprises a control unit for outputting a standby signal and shifting into a standby mode when for a predetermined time there has been no user-operation input for causing a vehicle sliding door driven by a motor to be open/close-driven and shifting into an operating mode and performing control of the motor when there has been a user-operation input and a switch unit for shorting power input terminals of the motor on the basis of the standby signal. When there has been no user-operation input for causing the sliding door to be open/close-driven for a predetermined time, by shifting into a standby mode the power consumption of the control unit can be kept small and as a result it is possible to suppress the battery power consumption of the control unit. Also, in the standby mode, by shorting the power input terminals of the motor it is possible to keep the motor in a locked state and thereby apply braking to the sliding door. Therefore, when the vehicle has been stopped or parked on sloping ground such as an upward slope or a downward slope, it is possible to prevent the sliding door from starting to move under its own weight when it is half-open.

6 Claims, 5 Drawing Sheets

VEHICLE INCLINATION ANGLE $\theta$

VEHICLE SLIDING DOOR OPENING/ CLOSING CONTROL DEVICE

BACKGROUND OF THE INVENTION

1. Field of the Invention

This invention relates to an opening/closing control device for controlling the opening and closing of a sliding door of a vehicle.

2. Description of the Related Art

Sliding door opening/closing control devices having a sliding door for sliding to open and close an opening in a vehicle body and a motor for driving this sliding door in opening and closing directions are disclosed in for example Japanese Utility Model Laid-Open Publications Nos. HEI 6-13915 and HEI 4-62883, Japanese Utility Model Post-Exam Publication No. HEI 6-13357 and Japanese Patent Laid-Open Publication No. HEI 4-285282.

Also, hinged vehicle door opening/closing control devices are disclosed in, for example, Japanese Patent Laid-Open Publications Nos. SHO 61-191781 and HEI 6-144000.

These known opening/closing control devices generally have a central processing unit (CPU) for controlling the operation of a motor for driving a door in opening and closing directions, a battery for supplying power to this CPU, a ROM containing a control program and a RAM for storing data.

The CPU executes program control of the motor by carrying out at a high speed the high-level computation necessary for controlling complicated opening and closing movements of the door.

The power consumed by the CPU is supplied from a battery mounted in the vehicle, and when the CPU is constantly in a state of performing high-level computation at a high speed the power consumption of the CPU is large and the electrical energy of the battery is consumed rapidly.

To deal with this problem, the battery is recharged with electricity generated using the rotation of the wheels while the vehicle is traveling. However, it is not possible to recharge the battery when the vehicle is stopped or parked and the wheels are not rotating. Consequently, it has been necessary to mount a large-capacity battery in the vehicle to provide for opening/closing control of the door when the vehicle is stopped or parked.

Also, because sliding door opening/closing control devices have not carried out opening/closing control of the sliding door when there has been no user-operation input for opening or closing the sliding door, when the vehicle has been stopped or parked on sloping ground such as an upward slope or a downward slope, when the sliding door is half-open, there has been a danger of the sliding door starting to move under its own weight and opening or closing at a considerable speed.

SUMMARY OF THE INVENTION

In view of the problems of the related art described above, it is an object of the present invention to provide a vehicle sliding door opening/closing control device wherein it is possible to suppress the power consumption of a CPU controlling the movement of a driving motor and prevent or limit movement of the sliding door caused by its own weight.

According to a first aspect of the invention, there is provided a sliding door opening/closing control device comprising a control unit for outputting a standby signal and shifting into a standby mode when for a predetermined time there has been no user-operation input for open/close-driving a sliding door driven by a motor and shifting into an operating mode and performing control of the motor when there has been a user-operation input and a switch unit for shorting the power input terminals of the motor on the basis of the standby signal.

Because the above-mentioned control unit, which consists of a CPU, shifts into a standby mode when for a predetermined time there has been no user-operation input for open/close-driving a sliding door, its power consumption can be kept small and the consumption of battery power due to this control unit can be suppressed.

Also, in the standby mode, by shorting the power input terminals of the motor it is possible to keep the motor in a locked state and thereby apply braking to the sliding door. Therefore, when the vehicle has been stopped or parked on sloping ground such as an upward slope or a downward slope, when the sliding door is not in a fully-open or fully-closed position (i.e. when it is half-open), the sliding door can be prevented from starting to move under its own weight. Even if the gradient of the sloping ground is steep and consequently the sliding door does start to move under its own weight, a brake is applied to the movement of the sliding door by the action of a counter electromotive force of the motor arising when the motor shaft is forcibly rotated in the shorted state, and the sliding door does not start an opening or closing movement suddenly.

Preferably, the opening/closing control device further comprises a tachogenerator for generating an output voltage corresponding to the rotational speed of the motor and a ROM and a RAM for respectively storing a control program for controlling the motor and data, and the control unit shifts into the operating mode when the output voltage of the tachogenerator exceeds a predetermined value. Also, preferably this control unit outputs a normal signal when it does not detect a malfunction of the switching means providing the user-operation input, the ROM or the RAM in the above-mentioned predetermined time and shifts into the standby mode when both the standby signal and the normal signal exist.

According to a second aspect of the invention, there is provided a vehicle sliding door opening/closing control device comprising a control unit for outputting a standby signal and shifting into a standby mode when for a predetermined time there has been no user-operation input for open/close-driving a sliding door driven by a motor and shifting into an operating mode and performing control of the motor when there has been a user-operation input, a PWM signal generating circuit for generating a pulse width modulated signal having a pulse width corresponding to the inclination of the vehicle body, and a switch unit for shorting the power input terminals of the motor on the basis of the standby signal and the pulse width modulated signal.

Because the PWM signal generating circuit of this opening/closing control device generates a PWM signal having a pulse width corresponding to the inclination of the vehicle body, by PWM(Pulse Width Modulation) -controlling the motor in shorting the power input terminals, it is possible to apply to the sliding door a suitable braking force corresponding to the inclination of the vehicle body by way of the motor. The time for which the power input terminals of the motor are shorted is preferably proportional to the inclination of the vehicle body.

According to a third aspect of the invention, there is provided a vehicle sliding door opening/closing control device comprising a control unit for outputting a standby signal and shifting into a standby mode when for a predetermined time there has been no user-operation input for open/close-driving a sliding door driven by a motor and shifting into an operating mode and performing control of the motor when there has been a user-operation input, a load generating circuit for generating an impedance corresponding to the inclination of the vehicle body, and a connecting circuit for connecting input and output terminals of the load generating circuit to the power input terminals of the motor on the basis of the standby signal.

By connecting the input and output terminals of the load generating circuit to the power input terminals of the motor it is possible to apply braking to the sliding door by way of the motor, and the sliding door can thereby be made to move less readily. Because the load generating circuit outputs an impedance corresponding to the inclination of the vehicle body it is possible to apply to the sliding door a suitable braking force corresponding to the inclination of the vehicle body by way of the motor.

These and other objects, features and merits of the invention will become clear from the following description of preferred embodiments set forth below with reference to the accompanying drawings.

DETAILED DESCRIPTION OF THE PREFERRED EMBODIMENTS

Figure 1:
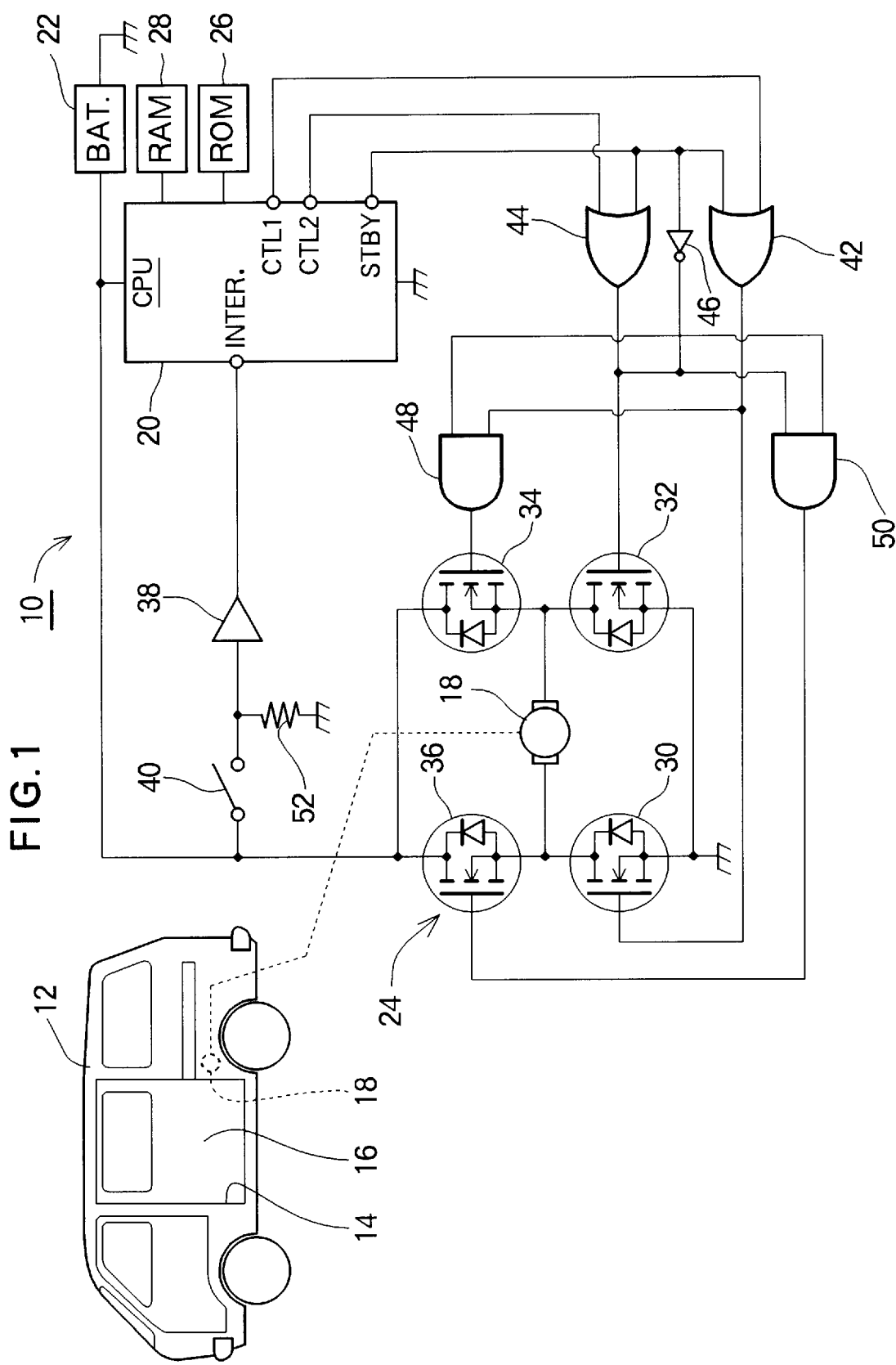
FIG. 1 is a schematic circuit diagram of a vehicle sliding door opening/closing control device according to a first preferred embodiment of the invention.

Several preferred embodiments of the invention will now be described in detail on the basis of the accompanying drawings. Throughout the drawings, similar or corresponding parts are shown with the same reference numerals.

FIG. 1 shows together with a vehicle body a circuit diagram of a vehicle sliding door opening/closing control device according to a first preferred embodiment of the invention. This opening/closing control device 10 comprises a drive motor 18 for driving in opening and closing directions a horizontal sliding door 16 which opens and closes an opening 14 formed in the body 12 of a vehicle, a control unit 20 for controlling the operation of this drive motor 18, a battery 22 for supplying power to the control unit 20 and the drive motor 18, and switching means 24 for shorting the terminals of the drive motor 18 on the basis of a command from the control unit 20.

The drive motor 18 is reversible and is mounted in a predetermined position on the vehicle body 12.

The opening/closing control device 10 is mainly composed of a microcomputer and has a central processing unit (CPU), which constitutes the control unit 20, a ROM (Read-Only Memory) 26 storing a program for controlling this control unit 20, and a RAM (Random Access Memory) 28 for storing various kinds of data.

The switching means 24 is made up of four MOSFETs (Metal Oxide Semiconductor Field Effect Transistors) 30, 32, 34, 36 connected to the two input terminals of the motor 18 in the form of a bridge.

An interrupt terminal INTER of the CPU (control unit) 20 is connected by way of a non-inverting amplifier (hereinafter abbreviated to 'amplifier') 38 to an operating switch 40.

Also, a standby terminal STBY of the CPU 20 is connected to one of the input terminals of each of a first OR circuit 42 and a second OR circuit 44 and to the input terminal of a NOT circuit 46. The other input terminal of the first OR circuit 42 is connected to a first control terminal CTL1 of the CPU 20. The other input terminal of the second OR circuit 44 is connected to a second control terminal CTL2 of the control unit 20.

The output terminal of the first OR circuit 42 is connected to one of the input terminals of a first AND circuit 48 and to the control terminal of the first MOSFET 30. Similarly, the output terminal of the second OR circuit 44 is connected to one of the input terminals of a second AND circuit 50 and to the control terminal of the second MOSFET 32. The output terminal of the NOT circuit 46 is connected to the other input terminal of the first AND circuit 48 and to the other input terminal of the second AND circuit 50. The output terminal of the first AND circuit 48 and the output terminal of the second AND circuit 50 are connected to the control terminal of the third MOSFET 34 and the control terminal of the fourth MOSFET 36 respectively.

The operating switch 40 may consist of for example a touch sensor of the sliding door 16, a push switch mounted on an inner handle, a pull switch mounted on an outer handle, or a manual switch for open/close-driving or stopping the sliding door 16. This operating switch 40 is in an OFF state when there is no user-operation input for open/close-driving the sliding door 16, and at this time the output of the amplifier 38 is at an L level. When on the other hand there has been a user-operation input for open/close-driving the sliding door 16, the operating switch 40 is in an ON state and the output of the amplifier 38 rises to an H level. In FIG. 1, the reference numeral 52 denotes a resistor for eliminating noise.

The CPU 20 monitors the level of the output signal of the amplifier 38 supplied to the interrupt terminal INTER, and when the operating switch 40 has been in the OFF state and the L-level output of the amplifier 38 has continued for a predetermined time, i.e. when there has been no user-operation input for open/close-driving the sliding door 16 for a predetermined time, the CPU 20 fixes the output of the standby terminal STBY at the H level and shifts into a standby mode. This predetermined time may for example be made thirty seconds or one minute, or may be made another suitable time taking various conditions into consideration. By shifting into a standby mode like this, the power consumption of the CPU can be kept small and it is possible to suppress the amount of battery power consumed by the CPU. Also, heating of the CPU can be kept small and it is possible to raise the reliability of the CPU.

The H-level standby signal output from the standby terminal STBY of the CPU 20 is supplied to one of the input terminals of each of the first OR circuit 42 and the second OR circuit 44 and to the input terminal of the NOT circuit 46. At this time, the output of the NOT circuit 46 is at the L level and on the basis of this signal the outputs of the first AND circuit 48 and the second AND circuit 50 are at the L level and the third and fourth MOSFETs 34, 36 are each in the OFF state.

Meanwhile, the outputs of the first OR circuit 42 and the second OR circuit 44 are both at the H level, and on the basis of these output signals the first and second MOSFETs 30, 32 are each in the ON state.

As a result of the first and second MOSFETs 30, 32 being in the ON state, the two input terminals (poles) of the drive motor 18 are shorted and the drive motor 18 is locked, and by this means it is possible to apply braking to the sliding door 16. Therefore, when the vehicle has been parked or stopped on sloping ground such as an upward slope or a downward slope, when the sliding door 16 is not in a fully-open or fully-closed position (i.e. when it is half-open), it is possible to prevent the sliding door 16 from starting to move under its own weight. Even if the gradient of the sloping ground is steep and the sliding door 16 does start to move under its own weight, braking is applied to the movement of the sliding door 16 by the action of a counter electromotive force of the shorted motor 18 arising when the motor shaft is forcibly rotated. Consequently, the sliding door 16 does not start an opening or closing movement suddenly.

When on the other hand there is a user-operation input for open/close-driving the sliding door 16, the operating switch 40 goes into the ON state and the output of the amplifier 38 rises to the H level.

When the output of the amplifier 38 inputted through the interrupt terminal INTER changes to the H level, that is, when there has been a user-operation input for open/close-driving the sliding door 16, the CPU 20 fixes the standby terminal STBY at the L level and shifts into an operating mode and controls the operation of the drive motor 18.

When the standby terminal STBY changes over to the L level, the output of the NOT circuit 46 rises to the H level and on the basis of this signal the outputs of the first and second AND circuits 48, 50 respectively become the same level as the outputs of the first and second OR circuits 42, 44.

The CPU 20 supplies a control signal for controlling the drive motor 18 from the first control terminal CTL1 via the first OR circuit 42 to the control terminals of the first and third MOSFETs 30, 34, and controls rotation of the motor 18 in a forward direction and thereby controls movement of the sliding door 16 in a forward direction (for example the opening direction).

A control signal for controlling the motor 18 from the second control terminal CTL2 is supplied via the second OR circuit 44 to the control terminals of the second and fourth MOSFETs 32, 36 and controls rotation of the drive motor 18 in a reverse direction and thereby controls movement of the sliding door 16 in a reverse direction (for example the closing direction). Thus the CPU 20 program-controls the motor 18 by means of the control signals from the first and second control terminals CTL1, CTL2.

A program for control stored in the ROM 26 is used. Because the program control itself does not form an essential feature of the present invention it will not be described here, but it may be of the kind disclosed in the aforementioned Japanese Unexamined Utility Model Publication No. H.4-62883.

Figure 2:
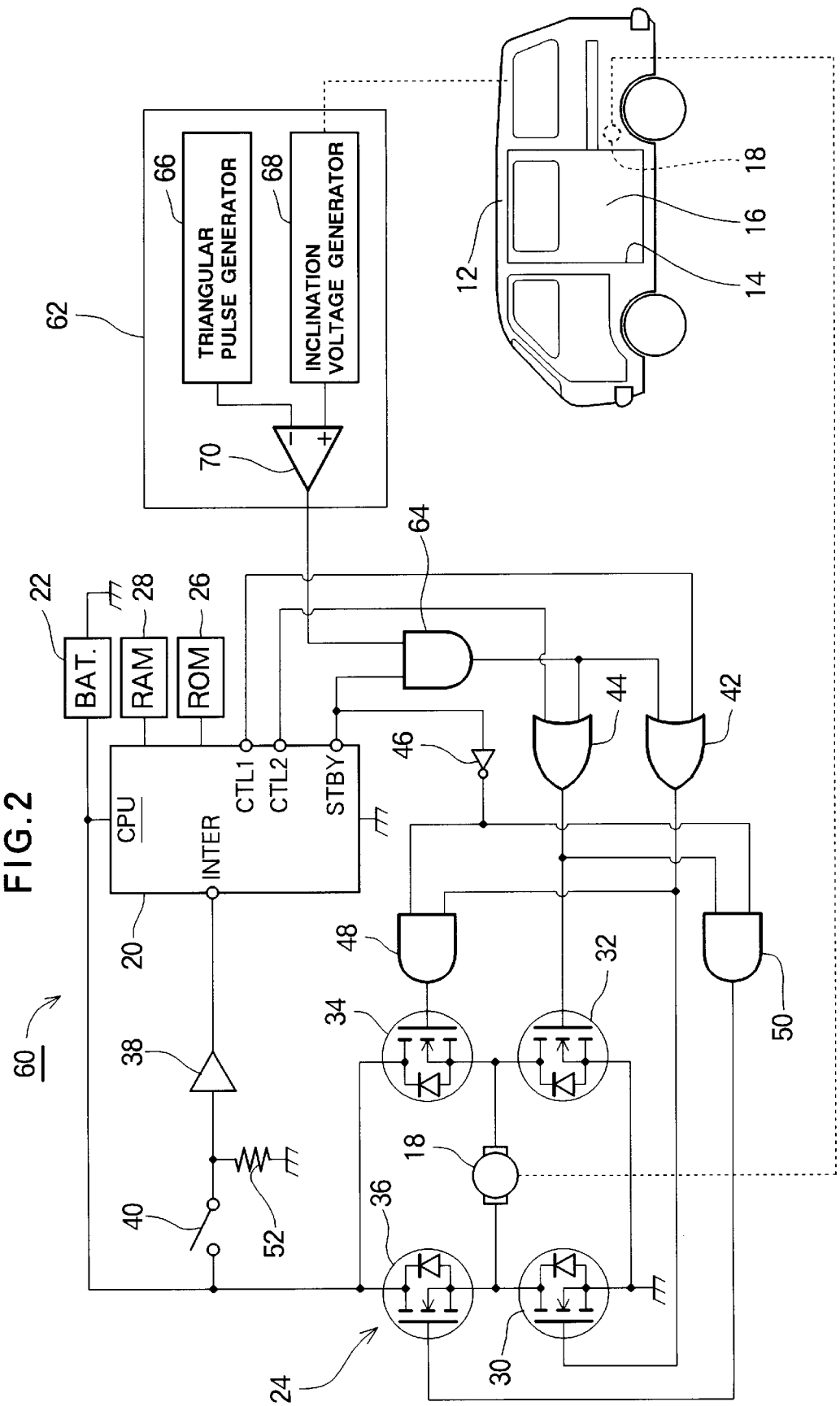
FIG. 2 is a schematic circuit diagram of a vehicle sliding door opening/closing control device according to a second preferred embodiment of the invention.

FIG. 2 shows a circuit diagram of a vehicle sliding door opening/closing control device 60 according to a second preferred embodiment of the invention. The opening/closing control device 60 of this preferred embodiment differs from the opening/closing control device 10 of the first preferred embodiment shown in FIG. 1 only in the point that there are provided a PWM signal generating circuit 62 for generating a PWM signal having a pulse width corresponding to the inclination of the vehicle body 12 and a third AND circuit 64 for supplying the logical sum of the PWM signal from this PWM signal generating circuit 62 and the standby signal from the CPU 20 to one input terminal of each of the first and second OR circuits. Parts the same as parts in the first preferred embodiment shown in FIG. 1 are shown with the same reference numerals and to avoid repetition will not be described in the following.

The operation of the opening/closing control device 60 will now be explained.

The CPU 20 monitors the level of the output signal of the amplifier 38 supplied to the interrupt terminal INTER, and when the operating switch 40 has been in the OFF state and the L-level output of the amplifier 38 has continued for a predetermined time, i.e. when there is no user-operation input for open/close-driving the sliding door 16 for a predetermined time, the CPU 20 fixes the output of the standby terminal STBY at the H level and shifts into a standby mode.

The H-level standby signal output from the standby terminal STBY of the CPU 20 is supplied to the input terminal of the NOT circuit 46 and one of the input terminals of the third AND circuit 64. At this time, the output of the NOT circuit 46 is at the L level and on the basis of this signal the outputs of the first AND circuit 48 and the second AND circuit 50 are at the L level, and the third and fourth MOSFETs 34, 36 are both in the OFF state.

The PWM signal from the PWM signal generating circuit 62 is supplied to the other input terminal of the third AND circuit 64. Because at this time the standby signal is being supplied to one of the input terminals of the third AND circuit 64, the output of this third AND circuit 64 is at the H level. On the basis of the H-level output signal from the third AND circuit 64 the outputs of the first OR circuit 42 and the second OR circuit 44 are both at the H level, and due to these output signals the first and second MOSFETs 30, 32 are both in the ON state.

As a result of the first and second MOSFETs 30, 32 being in the ON state, the two input terminals (poles) of the drive motor 18 are shorted and the drive motor 18 is locked, and consequently a brake is applied to the sliding door 16. At this time, the drive motor 18 is PWM-controlled by the PWM signal from the PWM signal generating circuit 62. Because as will be further discussed hereinafter this PWM signal has a pulse width corresponding to the inclination of the vehicle body 12, the two poles of the drive motor 18 are shorted for a time corresponding to the inclination of the vehicle body 12, and thus it is possible to apply to the sliding door 16 a braking force corresponding to the inclination of the vehicle body 12.

The PWM signal generating circuit 62 is made up of a triangular pulse generator 66 for generating a triangular wave, an inclination voltage generator 68 for generating a voltage corresponding to the inclination of the vehicle body 12, and a comparator 70 for comparing this voltage with the triangular wave and outputting a PWM signal having a pulse width corresponding to the inclination of the vehicle body 12.

The output voltage of the inclination voltage generator 68 increases as the inclination of the vehicle body 12 increases, and by this means the pulse width of the PWM signal can be lengthened. As a result of the pulse width of the PWM signal becoming longer, the ON state time of the first and second MOSFETs 30, 32 is extended and the time for which the two poles of the drive motor 18 are shorted becomes longer.

When the inclination of the vehicle body 12 is large, the half-open sliding door 16 tends to move under its own weight, but by the time for which the poles of the motor 18 are shorted being made longer, the locked state of the motor 18 is kept long and in this way a large braking force can be provided with respect to movement of the sliding door 16 under its own weight.

When the inclination of the vehicle body 12 is small, the output voltage of the inclination voltage generator 68 is small and by this means the pulse width of the PWM signal can be shortened. As a result of the pulse width of the PWM signal becoming shorter, the ON state time of the first and second MOSFETs 30, 32 shortens and the time for which the poles of the motor 18 are shorted becomes shorter.

When the inclination of the vehicle body 12 is small the likelihood of the half-open sliding door 16 moving under its own weight is smaller, but as a result of the time for which the poles of the motor 18 are shorted being reduced the locked state of the motor 18 is held for a short time only and in this way it is possible to provide a braking force of a size corresponding to the tendency of the sliding door 16 to move under its own weight.

The operation of the opening/closing control device 60 when there has been a user-operation input for open/close-driving the sliding door 16 is essentially the same as the operation of the opening/closing control device 10 of the first preferred embodiment shown in FIG. 1, and to avoid repetition will not be described again here.

Figure 3:
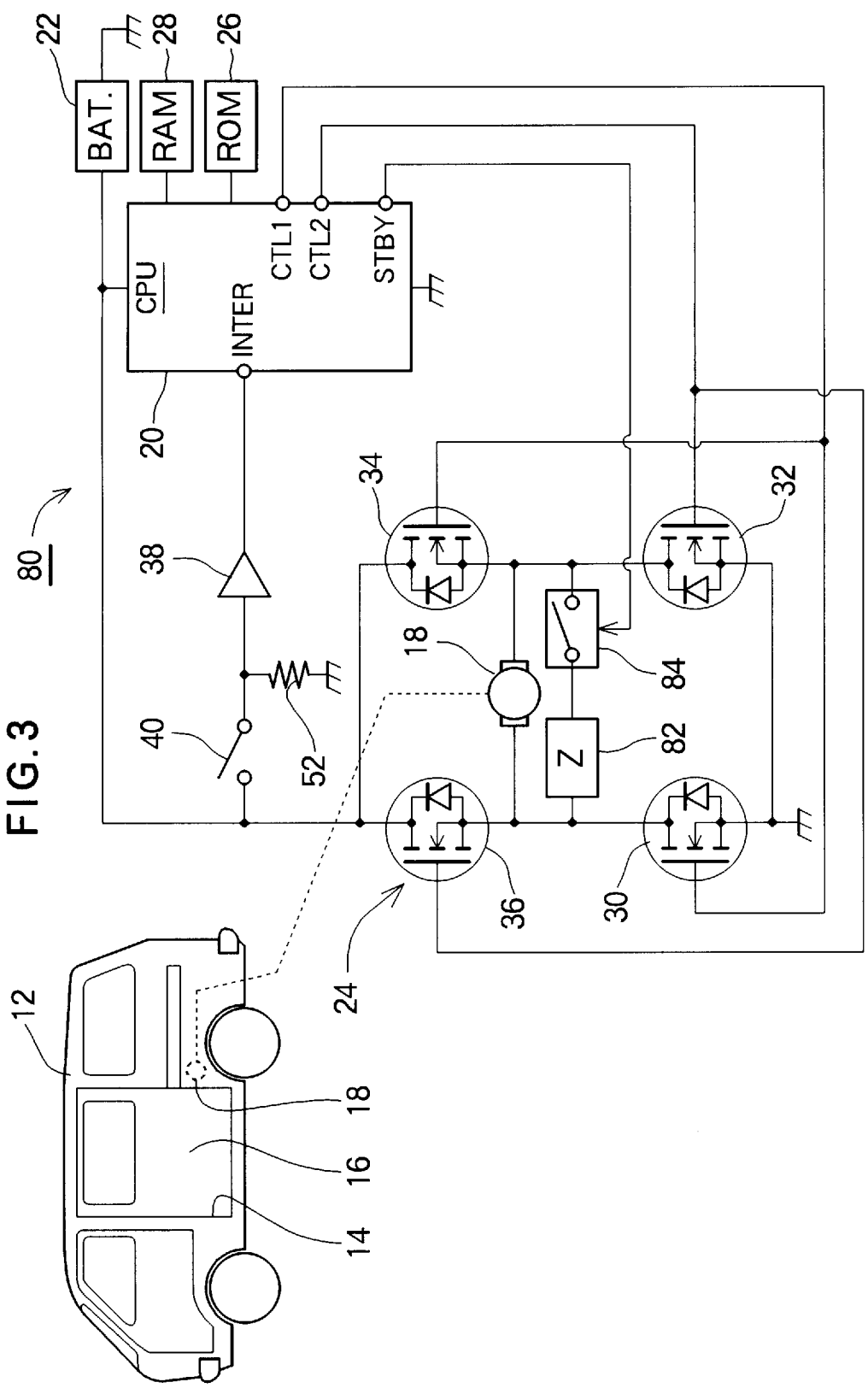
FIG. 3 is a schematic circuit diagram of a vehicle sliding door opening/closing control device according to a third preferred embodiment of the invention.

FIG. 3 shows a circuit diagram of a vehicle sliding door opening/closing control device 80 according to a third preferred embodiment of the invention. This opening/closing control device 80 differs from the opening/closing control device 10 of the first preferred embodiment shown in FIG. 1 in the point that it has a load generating circuit 82 for generating an impedance corresponding to the inclination of the vehicle body 12 and a relay 84 for connecting an input/output terminal of the load generating circuit 82 to a power supply input terminal of the motor 18 on the basis of a standby signal. Parts the same as parts in the first preferred embodiment shown in FIG. 1 are shown with the same reference numerals and will not be described in the following.

The load generating circuit 82 and the relay 84 are connected to the switching means 24 consisting of the four MOSFETs 30 to 36 in a parallel relationship with the motor 18. Also, the relay 84 is connected to the standby terminal STBY of the CPU 20. The first control terminal CTL1 of the CPU 20 is directly connected to the control terminals of the first and third MOSFETs 30, 34. Similarly, the second control terminal CTL2 of the CPU 20 is directly connected to the second and fourth MOSFETs 32, 36. In place of the relay 84, a switching device such as a transistor or a FET may alternatively be used.

This opening/closing control device 80 operates as follows. The CPU 20 monitors the level of the output signal of the amplifier 38 supplied to the interrupt terminal INTER, and when the operating switch 40 has been in the OFF state and the L-level output of the amplifier 38 has continued for a predetermined time, i.e. when there has been no user-operation input for open/close-driving the sliding door 16 for a predetermined time, the CPU 20 fixes the output of the standby terminal STBY at the H level and shifts into a standby mode.

The H-level standby signal output from the standby terminal STBY of the CPU 20 switches the relay 84 to the ON state. As a result, the power supply input terminal of the motor 18 and the input/output terminal of the load generating circuit 82 are electrically connected, a load acts on the motor 18 and consequently it becomes difficult for the sliding door 16 to move.

At this time, because as will be further discussed below the load generating circuit 82 generates an impedance corresponding to the inclination of the vehicle body 12, a braking force corresponding to the inclination of the vehicle body 12 can be applied to the sliding door 16.

Figure 4:
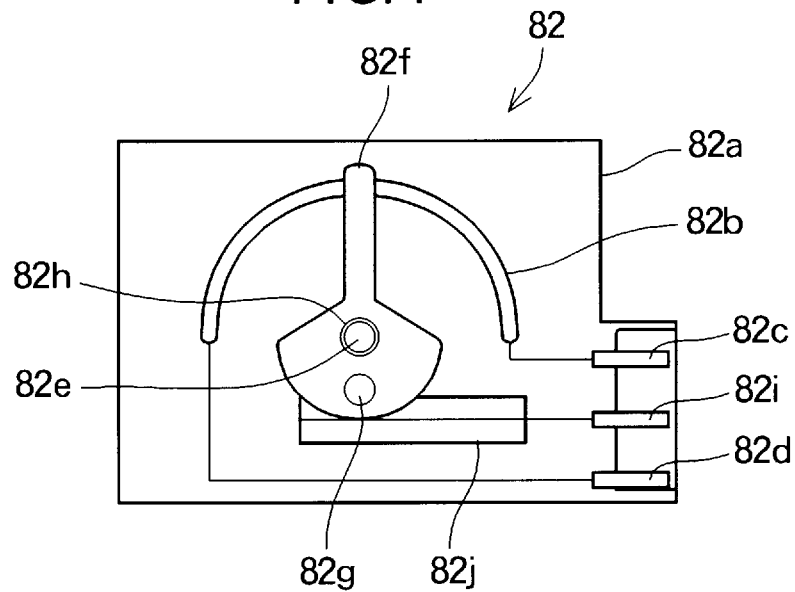
FIG. 4 is a schematic front view of a vehicle inclination angle sensor used as a load generating circuit of the opening/closing control device shown in FIG. 3.
Figure 5:
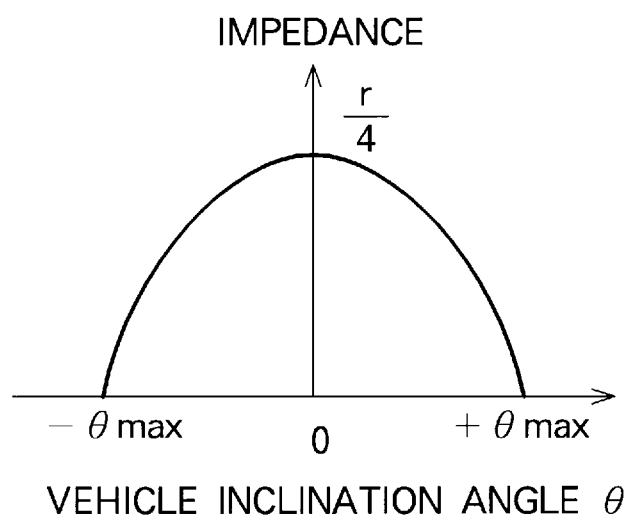
FIG. 5 is an impedance characteristic chart of a load generating circuit using the vehicle inclination angle sensor shown in FIG. 4.

The load generating circuit 82 is constituted using for example a vehicle inclination angle sensor of the kind shown in FIG. 4, which detects the inclination of the vehicle and outputs an electrical signal. This vehicle inclination angle sensor (load generating circuit) 82 is made up of a resistor 82b on an insulating substrate 82a fixed to the vehicle body 12, a fixed voltage terminal 82c and a ground terminal 82d electrically connected to the ends of this resistor 82b, a pendulum-style slider 82f which is rotatably fitted to a support shaft 82e formed integrally with the center of the insulating substrate 82a and slides over the resistor 82b, a weight 82g provided at the lower end of the pendulum-style slider 82f, a bushing 82h provided at the center of rotation of the pendulum-style slider 82f, and a conductor 82j connecting the pendulum-style slider 82f to an output terminal 82i. Because the pendulum-style slider 82f is held in a vertical state at all times by the weight 82g provided at its lower end, when the vehicle body 12 inclines, the pendulum-style slider 82f slides over the resistor 82b on the insulating substrate 82a. At this time, the point of contact between the pendulum-style slider 82f and the resistor 82b changes according to the angle of inclination of the vehicle body 12. By shorting the fixed voltage terminal 82c and the ground terminal 82d and making this ground terminal 82d and the output terminal 82i input/output terminals of the vehicle inclination angle sensor (load generating circuit) 82, a parabolic impedance characteristic of the kind shown in FIG. 5 can be obtained. In FIG. 5, the reference numeral r denotes the value of the resistance between the fixed voltage terminal 82c and the ground terminal 82d, and $\theta_{max}$ denotes the maximum inclination angle that the vehicle inclination angle sensor 82 can detect. As can be seen from FIG. 5, the vehicle inclination angle sensor (load generating circuit) 82 generates a low impedance when the inclination of the vehicle body 12 is large and generates a high impedance when the inclination of the vehicle body 12 is small.

This vehicle inclination angle sensor 82 can also be used as the inclination voltage generator 68 shown in FIG. 2. In this case, the fixed voltage terminal 82c and the ground terminal 82d of the vehicle inclination angle sensor 82 are shorted, this ground terminal 82d and one end of the resistor 82b are connected, a fixed voltage is applied to the output terminal 82i with the other end of this resistor 82b as a reference, and the potential difference appearing across the ends of the resistor 82b is taken as a voltage corresponding to the inclination of the vehicle body 12.

When on the other hand there is a user-operation input for open/close-driving the sliding door 16, the operating switch 40 goes into the ON state and the output of the amplifier 38 rises to the H level.

When the output of the amplifier 38 inputted into the interrupt terminal INTER has switched to the H level, that is, when there has been a user-operation input for open/close-driving the sliding door 16, the CPU 20 fixes the standby terminal STBY at the L level and shifts into the operating mode and controls the operation of the motor 18.

When the standby terminal STBY switches to the L level, the relay 84 goes into the OFF state and the power supply input terminal of the motor 18 and the input/output terminal of the load generating circuit 82 are electrically disconnected.

The CPU 20 supplies a signal for controlling the motor 18 from the first control terminal CTL1 to the control terminals of the first and third MOSFETs 30, 34, and controls rotation of the motor 18 in a forward direction and thereby controls movement of the sliding door 16 in a forward direction (for example the opening direction).

Also, a signal for controlling the motor 18 is supplied from the second control terminal CTL2 of the CPU 20 to the second and fourth MOSFETs 32, 36 to control rotation of the motor 18 in a reverse direction and thereby control movement of the sliding door 16 in a reverse direction (for example the closing direction). In this way, the CPU 20 program-controls the motor 18 by means of control signals from the first and second control terminals CTL1, CTL2. A control program stored in the ROM 26 is used.

Figure 6:
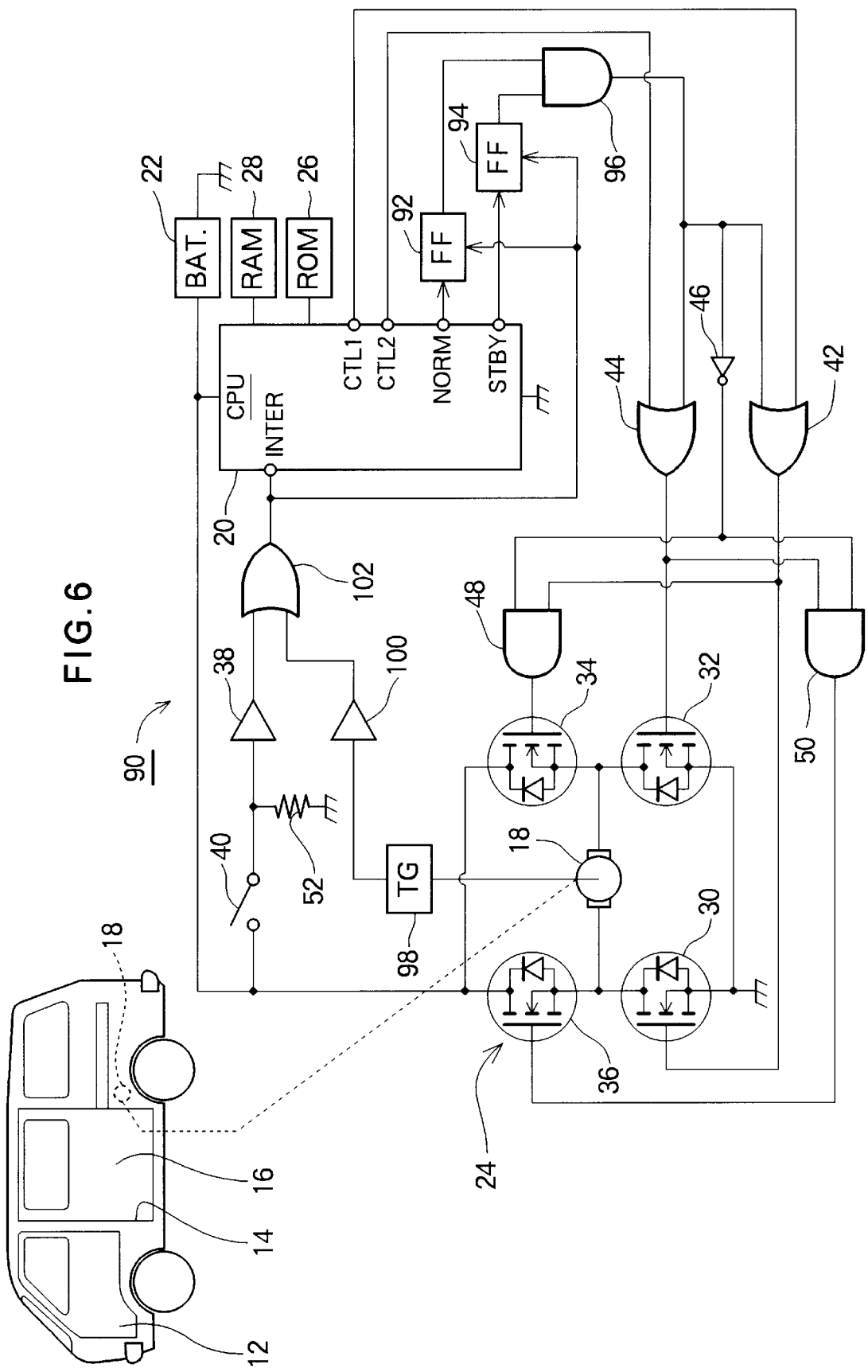
FIG. 6 is a schematic circuit diagram of a vehicle sliding door opening/closing control device according to a fourth preferred embodiment of the invention.

FIG. 6 shows a circuit diagram of a vehicle sliding door opening/closing control device 90 according to a fourth preferred embodiment of the invention. The opening/closing control device 90 of this preferred embodiment differs from the opening/closing control device 10 of the first preferred embodiment shown in FIG. 1 in the following two points.

The first point of difference is that in addition to the standby terminal STBY for outputting a standby signal when for a predetermined time there has been no user-operation input for open/close-driving the sliding door 16 the CPU 20 further comprises a normal terminal NORM for outputting a normal signal when no malfunction of a part such as the operating switch 40, the RAM 28 or the ROM 26 (for example defective switch operation or a memory access error) has been detected in the aforementioned predetermined time, and shifts into a standby mode when there is both a standby signal and a normal signal.

To achieve this, the normal terminal NORM of the CPU 20 is connected to the S (set) terminal of a first R-S flip-flop 92 and the standby terminal STBY is connected to the S (set) terminal of a second R-S flip-flop 94. The output terminals of the first and second R-S flip-flops 92, 94 are connected to the input terminal of a fourth AND circuit 96, and the output terminal of the fourth AND circuit 96 is connected to one of the input terminals of each of the first OR circuit 42 and the second OR circuit 44 and to the input terminal of the NOT circuit 46.

The second point of difference is that there is provided a tachogenerator 98 for converting the rotational speed of the motor 18 into a voltage and for example when the output voltage of the tachogenerator 98 reaches a predetermined value when the motor 18 is forcibly rotated by movement of the sliding door 16 under its own weight the CPU 20 is shifted into the operating mode. The tachogenerator 98 is connected to one of the input terminals of a third OR circuit 102 by way of a non-inverting amplifier (hereinafter abbreviated to 'amplifier') 100 for amplifying this output voltage. The output of the amplifier 100 switches from an L level to an H level when the output voltage of the tachogenerator 98 reaches a predetermined value. The output terminal of the amplifier 100 is connected to the other input terminal of the third OR circuit 102, and the output terminal of the third OR circuit 102 is connected to the interrupt terminal INTER of the CPU 20 and to the R (reset) terminals of the first and second R-S flip-flops 92, 94.

The other parts are the same as parts shown in FIG. 1 and therefore are shown with the same reference numerals as those used in FIG. 1 and will not be described again here.

The operation of the opening/closing control device 90 will now be described.

The CPU 20 monitors the level of the output signal of the third OR circuit 102 supplied to the interrupt terminal INTER and outputs a pulse signal (standby signal) from the STNBY terminal when an L-level output of the third OR circuit 102 has continued for a predetermined time, i.e. when the operating switch 40 has been in the OFF state and the L-level output of the amplifier 38 has continued for a predetermined time (that is, when the has been no user-operation input for open/close-driving the sliding door 16 for a predetermined time), or when the state of the motor 18 being stopped and the output voltage of the tachogenerator 98 being zero has continued for a predetermined time (i.e. when the sliding door has been stopped for a predetermined time), and monitors whether or not there has been a malfunction of a part such as the operating switch 40, the RAM 28 or the ROM 26, and when it does not detect a malfunction of any of these parts in the aforementioned predetermined time outputs a pulse signal (normal signal) from the NORM terminal and shifts into the standby mode.

The pulse signal output from the normal terminal NORM of the CPU 20 is supplied to the S terminal of the first R-S flip-flop 92, and the output of this first R-S flip-flop 92 rises to the H level. Also, the pulse signal from the STBY terminal is supplied to the S terminal of the second R-S flip-flop 94 and the output of this second R-S flip-flop 94 rises to the H level. The H-level output signals from the first and second R-S flip-flops 92, 94 are supplied to the fourth AND circuit 96 and the output of this fourth AND circuit 96 rises to the H level. The H-level signal output from the fourth AND circuit 96 is supplied to one of the input terminals of each of the first OR circuit 42 and the second OR circuit 44 and to the input terminal of the NOT circuit 46.

At this time, the output of the NOT circuit 46 becomes L-level, and on the basis of this signal the outputs of the first AND circuit 48 and the second AND circuit 50 become L-level and the third and fourth MOSFETs 34, 36 become ON. Meanwhile, the outputs of the first OR circuit 42 and the second OR circuit 44 both become H-level, and on the basis of these output signals the first and second MOSFETs 30, 32 both become ON.

As a result of the first and second MOSFETs 30, 32 becoming ON, the two input terminals (poles) of the motor 18 are shorted and the motor 18 is locked, and consequently a brake is applied with respect to movement of the sliding door 16. Therefore, when the vehicle has been parked or stopped on sloping ground such as an upward slope or a downward slope, when the sliding door 16 is not in a fully-open or fully-closed position (i.e. when it is half-open), it is possible to prevent the sliding door 16 from starting to move under its own weight. Even if the gradient of the sloping ground is steep and the sliding door 16 does start to move under its own weight, braking can be applied to the sliding door 16 from when at the start of the movement the speed of movement of the sliding door 16 (the rotational speed of the motor 18) is slow and the output voltage of the tachogenerator 98 consequently is low, and it is possible to prevent the sliding door 16 from accelerating rapidly under its own weight. When the movement of the sliding door 16 reaches a predetermined speed and the output voltage of the tachogenerator 98 reaches a predetermined value and the amplifier 100 switches to the H level, the rise of the output signal of the third OR circuit 102 is detected at the interrupt terminal INTER and the CPU 20 shifts into the operating mode and can perform program-control of the motor 18. A control program stored in the ROM 26 is used.

When a malfunction of one of the parts is detected within the aforementioned predetermined time, a pulse signal (normal signal) is not output from the NORM terminal. Therefore, the output of the first R-S flip-flop 92 becomes L-level. Therefore, even if a pulse signal (standby signal) has been output from the standby terminal STBY of the CPU 20, the output of the fourth AND circuit 96 becomes L-level and all of the MOSFETs 30 to 36 go OFF. Consequently, the motor 18 does not rotate.

When there is a user-operation input for open/close-driving the sliding door 16, the operating switch 40 becomes ON and the output of the amplifier 38 rises to the H level. Also, when the motor 18 has rotated at above a predetermined speed, the output voltage of the tachogenerator 98 also rises above a predetermined value and consequently the output of the amplifier 100 rises to the H level.

The CPU 20 monitors the output of the amplifiers 38, 100 through the interrupt terminal INTER, and when the output of the third OR circuit 102 changes from the L level to the H level, i.e. when there has been a user-operation input for open/close-driving the sliding door 16 or when the motor 18 has rotated, the CPU 20 shifts into the operating mode and controls the motor 18.

Also, when the output of the third OR circuit 102 changes from the L level to the H level, this signal is supplied to the R terminals of the first and second R-S flip-flops 92, 94 and the outputs of the first and second R-S flip-flops 92, 94 fall to the L level and consequently the output of the fourth AND circuit 96 becomes L-level.

When the output of the fourth AND circuit 96 changes over to the L level the output of the NOT circuit 46 becomes H-level and as a result of this signal the outputs of the first and second AND circuits 48, 50 become the same level as the outputs of the first and second OR circuits 42, 44 respectively.

The CPU 20 supplies a control signal for controlling the motor 18 from the first control terminal CTL1 via the first OR circuit 42 to the control terminals of the first and third MOSFETs 30, 34 and controls rotation of the motor 18 in a forward direction and thereby controls movement of the sliding door 16 in a forward direction (for example the opening direction). Also, a signal for controlling the motor 18 from the second control terminal CTL2 of the CPU 20 is supplied via the second OR circuit 44 to the control terminals of the second and fourth MOSFETs 32, 36 and controls rotation of the motor 18 in a reverse direction and thereby controls movement of the sliding door 16 in a reverse direction (for example the closing direction). In this way, the CPU 20 program-controls the motor 18 by means of control signals from the first and second control terminals CTL1, CTL2.

The CPU 20 may fix the first and second control terminals CTL1, CTL2 at the L level before shifting into the standby mode.

Various changes and modifications can be made to this invention with reference to the teachings set forth above. Therefore, it is clear that the invention can be practiced in forms other than the specific preferred embodiments set forth here.

What is claimed is:

1. A vehicle sliding door opening/closing control device for controlling the movement of a sliding door which opens and closes an opening formed in the body of a vehicle, comprising:

a motor for driving the sliding door in an opening/closing direction;

switching means for providing a user-operation input for causing the sliding door to be open/close-driven;

a control unit for outputting a standby signal and shifting into a standby mode when for a predetermined time there has been no user-operation input for causing the sliding door to be open/close-driven and shifting into an operating mode and performing control of the motor when there has been a user-operation input;

a battery for supplying power to the motor and the control unit; and a switch unit for shorting power input terminals of the motor on the basis of the standby signal.

2. A vehicle sliding door opening/closing control device according to claim 1, further comprising a tachogenerator for generating an output voltage corresponding to the rotational speed of the motor and a ROM and a RAM storing a control program for controlling the motor and data respectively, wherein the control unit shifts into the operating mode when the output voltage of the tachogenerator exceeds a predetermined value, and the control unit outputs a normal signal when it does not detect a malfunction of the switching means, the ROM or the RAM in the predetermined time and shifts into the standby mode when both the standby signal and the normal signal exist.

3. A vehicle sliding door opening/closing control device for controlling the movement of a sliding door which opens and closes an opening formed in the body of a vehicle, comprising:

a motor for driving the sliding door in an opening/closing direction;

switching means for providing a user-operation input for causing the sliding door to be open/close-driven;

a control unit for outputting a standby signal and shifting into a standby mode when for a predetermined time there has been no user-operation input for causing the sliding door to be open/close-driven and shifting into an operating mode and performing control of the motor when there has been a user-operation input;

a battery for supplying power to the motor and the control unit;

a PWM signal generating circuit for generating a pulse width modulated signal having a pulse width corresponding to the inclination of the vehicle body; and a switch unit for shorting power input terminals of the motor on the basis of the standby signal and the pulse width modulated signal.

4. A vehicle sliding door opening/closing control device according to claim 3, wherein the time for which the power input terminals of the motor are shorted is proportional to the angle of inclination of the vehicle body.

5. A vehicle sliding door opening/closing control device for controlling the movement of a sliding door which opens and closes an opening formed in the body of a vehicle, comprising:

a motor for driving the sliding door in an opening/closing direction;

switching means for providing a user-operation input for causing the sliding door to be open/close-driven;

a control unit for outputting a standby signal and shifting into a standby mode when for a predetermined time there has been no user-operation input for causing the sliding door to be open/close-driven and shifting into an operating mode and performing control of the motor when there has been a user-operation input;

a battery for supplying power to the motor and the control unit;

a load generating circuit for generating an impedance corresponding to the inclination of the vehicle body; and a connecting circuit for connecting input and output terminals of the load generating circuit to power input terminals of the motor.

6. A vehicle sliding door opening/closing control device according to claim 5, wherein the load generating circuit generates an impedance proportional to the inclination of the vehicle body.

* * * * *